March 4, 1930.  A. E. ANDERSON  1,749,688
AUTOMATIC RECLOSING CIRCUIT BREAKER SYSTEM
Filed Feb. 8, 1929
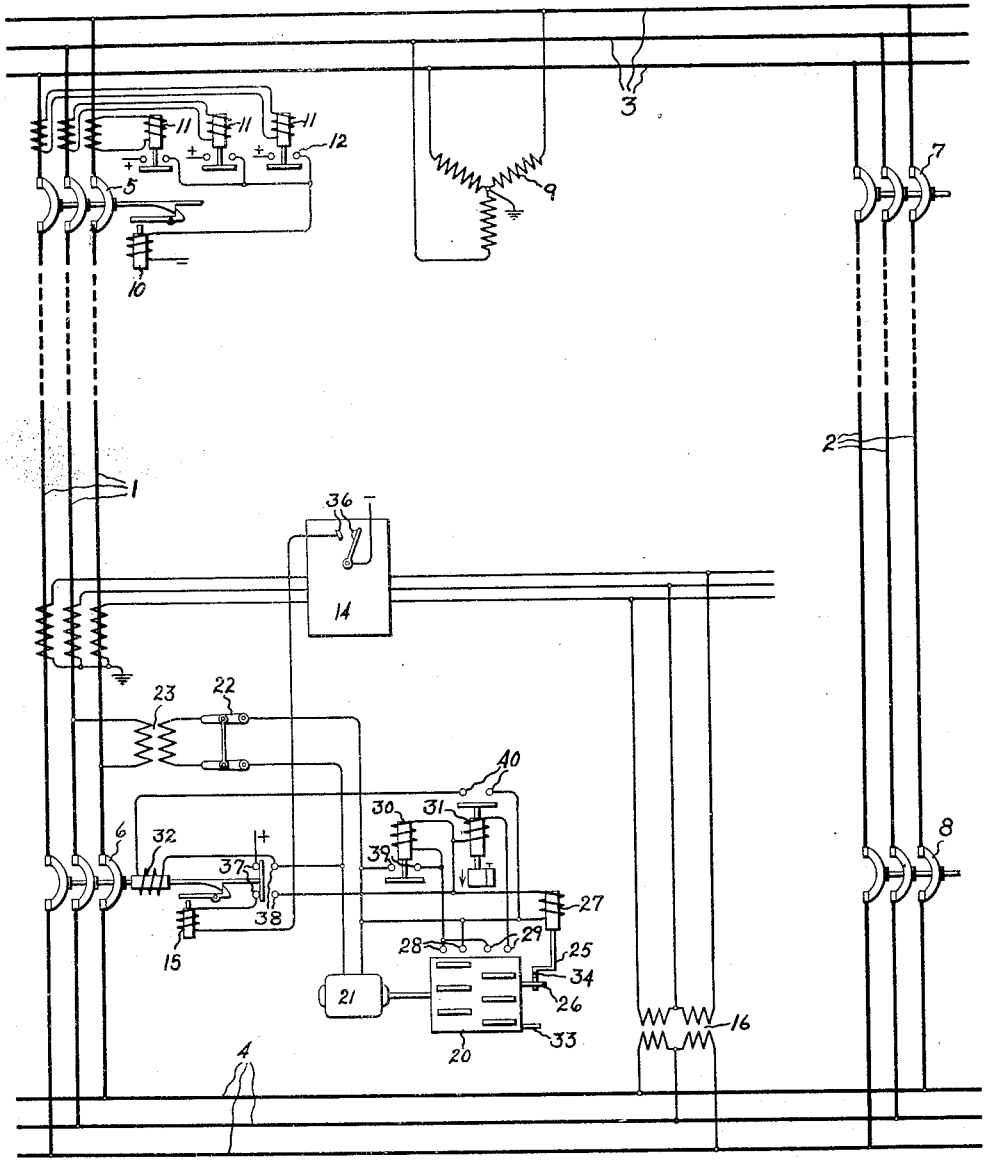
Inventor:
Arvid E. Anderson
by Charles E. Tullar
His Attorney.

Patented Mar. 4, 1930

1,749,688

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

AUTOMATIC RECLOSING CIRCUIT-BREAKER SYSTEM

Application filed February 8, 1929. Serial No. 338,584.

My invention relates to automatic reclosing circuit breaker systems and particularly to a system for controlling a circuit breaker between two polyphase circuits.

In a polyphase system of electric distribution in which a polyphase load circuit is supplied by a plurality of polyphase supply circuits, such as parallel polyphase feeders, it is desirable to disconnect a supply circuit from the load circuit when a fault occurs on the supply circuit and to reconnect the supply circuit to the load circuit automatically when the supply circuit is reenergized. Heretofore, this result has been accomplished by providing suitable fault responsive means, such as power directional means, for effecting the disconnection of a faulty supply circuit from the load circuit when the power flows from the load circuit to the supply circuit and by providing means responsive to the simultaneous energization of all of the phases of the supply circuit for effecting the connection thereof to the load circuit. When such a reclosing arrangement is used to control the connections of a high voltage supply circuit, a plurality of high voltage potential transformers are required to supply current to the reclosing means. Since potential transformers of this type are expensive, it is desirable to eliminate as many as possible and one object of my invention is to provide an improved arrangement for controlling the connection of a polyphase supply circuit to a polyphase load circuit whereby only one potential transformer is required for controlling the reclosing operation.

My invention will be better understood from the following description taken in connection with the accompanying drawing and its scope will be pointed out in the appended claims.

Referring to the drawing which illustrates diagrammatically a system of distribution embodying my invention, 1 and 2 represent two parallel connected polyphase feeders between a polyphase supply bus 3 and a polyphase load bus 4. The feeder 1 is connected to the supply bus 3 by a circuit breaker 5 and to the load bus 4 by a circuit breaker 6. The feeder 2 is connected to the supply bus 3 by a circuit breaker 7 and to the load bus 4 by a circuit breaker 8. A suitable source of polyphase current such as a star-connected generator 9 with its neutral connected to ground in any suitable manner is connected to the supply bus 3.

In order to effect the disconnection of a faulty feeder, the circuit breaker at the supply bus end thereof is arranged to be opened in any suitable manner, such as in response to an overcurrent in any phase of the polyphase feeder at the supply bus end thereof and the circuit breaker at the load bus end of the feeder is arranged to be opened in response to a power reversal in any phase of the feeder at the load bus end thereof. In the arrangement shown in the drawing, which, in order to simplify the disclosure, only shows in detail the control apparatus associated with the feeder 1, it being understood however that the feeder 2 has similar control apparatus associated therewith, the above results are accomplished by providing the circuit breaker 5 with a trip coil 10 which, when energized, is arranged to effect the opening of the circuit breaker. The energization of the trip coil 10 is controlled by the overcurrent relays 11 which are connected, in any suitable manner, so that they are responsive respectively to the currents in the different phases of the feeder 1 at the supply bus end thereof. When the current in any phase conductor exceeds a predetermined amount the corresponding overcurrent relay 11 closes its contacts 12 and completes an energizing circuit for the trip coil 10.

For effecting the opening of the circuit breaker 6 in response to a power reversal through it, I provide a suitable power directional relay 14, examples of which are well known in the art, which is arranged to effect the energization of a trip coil 15 associated with the circuit breaker 6 when current reverses in any one of the conductors of the feeder 1 at the load bus end thereof. Preferably the voltage windings of the power directional relay 14 are connected to the secondary windings of a set of potential transformers 16, the primary windings of which are connected across the load bus 4 so that a single set of single phase potential transformers can be used to energize the reverse power relays associated with the respective feeders.

In order to effect the automatic reclosing of the circuit breaker 6 after a fault on the feeder 1 has effected the opening thereof, I provide a suitable automatic reclosing arrangement, examples of which are well known in the art, for effecting the closing of the circuit breaker 6 when voltage is restored to normal across one of the phases of the feeder 1. As shown in the drawing, the automatic reclosing arrangement includes a timer 20 which is driven by a motor 21 permanently connected by means of a control switch 22 to the secondary winding of a single phase potential transformer 23 the primary of which is connected to the feeder 1 in any suitable manner so as to be energized in response to a predetermined single phase voltage thereof. The timer 20 is normally prevented from rotating by a movable stop 25 which is in engagement with a projection 26 on the timer 20. The operation of the timer is effected by energizing a release magnet 27 which when energized moves the stop 25 out of engagement with the projection 26 so that the motor 21 is free to rotate the timer 20. As the timer 20 rotates, it is arranged to close successively the contacts 28 and 29 with predetermined timed intervals between successive closures of the contacts. When the contacts 28 are closed a circuit is completed for a control relay 30 which, when energized, completes a locking-circuit for itself which is independent of the contacts 28 so that the control relay is not deenergized by the subsequent opening of the contacts 28. When the relay 30 is energized and the timer 20 closes its contacts 29, a circuit is completed for a control relay 31 which, when energized, completes an energizing circuit for the closing coil 32 of the circuit breaker 6.

It will be observed that with the arrangement above described the operation of the timer 20 is effected whenever the circuit breaker 6 is open and the phase, to which the primary of the transformer 23 is connected, is energized. With such an arrangement, however, a fault may occur on the feeder 1 in such a manner as to effect the opening of thte circuit breaker 6 without effecting the opening of the circuit breaker 5. For example, assume that the feeder conductor, to which the primary winding of the transformer 23 is not connected, becomes broken near an insulator, and the load bus end of the broken conductor becomes grounded. Under such conditions a reversal of power occurs through the circuit breaker 6 so that the reverse power relay 14 effects the opening thereof. The opening of the circuit breaker 5, however, is not effected because the supply bus end of the broken conductor is not grounded. The circuit breaker 6 is arranged to be tripped, by its associated protective relays in advance of circuit breaker 7 so that the opening of circuit breaker 6 removes the accidental ground from the load bus 4 before the circuit breaker 7 can open.

Since the circuit breaker 5 is not opened by the fault, the transformer 23 remains energized after the circuit breaker 6 opens and, therefore, the automatic reclosing equipment effects the reclosing of the circuit breaker 6 after it has been opened a predetermined length of time. If the ground is still connected to the broken conductor when the circuit breaker 6 recloses the power directional relay 14 again effects the opening thereof and the above cycle of operation is repeated as long as the circuit breaker 5 remains closed and the ground remains connected to the load bus end of the broken conductor.

In order to prevent continuous operation of the breaker under such conditions, the reclosing equipment is provided with suitable means for limiting the number of automatic reclosures. In the arrangement shown in the drawing, this result is obtained by providing the timer 20 with a projection 33 which is arranged to engage the stop 25 if the release magnet 27 is energized after the timer 20 has been in operation for a predetermined length of time and has effected a predetermined number of reclosures of the circuit breaker 6. In order to maintain the timer 20 in its locked out position in case the release magnet 27 becomes deenergized after the timer has reached its locked out position the stop 25 is provided with a groove 34 into which the projection 33 enters when it engages the stop 25 to hold it in its locked out position.

The operation of the arrangement shown in the drawing is as follows: Under normal operating conditions the circuit breakers 5, 6, 7 and 8 are closed. When a fault occurs on the feeder 1 which causes an overcurrent to flow from the supply circuit 3 to the fault, the overcurrent relay 11 in a faulty phase conductor closes its contacts 12 and completes an energizing circuit for the trip coil 10 to effect the opening of the circuit breaker 5. Since the load circuit 4 is energized through the feeder 2, reverse current flows through the circuit breaker 6 to the fault and this reverse current causes the power directional relay 14 to close its contacts 36 and complete, through the auxiliary contacts 37 on the circuit breaker 6, an energizing circuit for the trip coil 15 to effect the opening of the circuit breaker 6. Preferably, the time setting of the reverse power relay 14 is less than the overcurrent relays 11 so that the circuit breaker 6 is opened before the overcurrent relays 11 associated with the circuit breaker 7 can operate and effect the opening of the circuit breaker 7.

Since both of the circuit breakers 5 and 6 are opened, the closing of the auxiliary contacts 38 on the circuit breaker 6 does not effect the operation of the release coil 27 to start the timer because the phase of the feeder 1 to which the primary of the transformer 23 is connected is deenergized. After the fault has been removed and the circuit breaker 5 is closed so that the feeder 1 is reenergized, a circuit is completed for the release magnet 27 across the secondary of the transformer 23. This circuit also includes the auxiliary contacts 38 on the open switch 6. The energization of the release magnet 27 moves the stop 25 out of engagement with the projection 26 so that the reenergized motor 21 can rotate the timer 20. When the timer closes its contacts 28, the coil of the control relay 30 and the auxiliary contacts 38 are connected in series across the secondary of the transformer 23. The relay 30 by closing its contacts 39 completes an energizing circuit for itself which is independent of the contacts 28 so that the relay 30 remains energized after the contacts 28 are subsequently opened. When the timer subsequently closes its contacts 29 a circuit is completed for the control relay 31 through contacts 39 of the control relay 30 and auxiliary contacts 38 of the circuit breaker 6. The control relay 31 by closing its contacts 40 connects the closing coil 32 across the secondary of the transformer 23 to reclose the circuit breaker 6. The circuit breaker 6 by opening its auxiliary contacts 38 effects the deenergization of the release magnet 27 and the control relays 30 and 31 so that the closing coil 32 is deenergized after the circuit breaker has closed. The motor 21, however, continues to rotate the timer 20 until it reaches its normal position and the projection 26 engages the stop 25.

When a fault occurs on the feeder 1 which effects a reversal of power through the circuit breaker 6 but does not effect the opening of the circuit breaker 5 the operation is similar to that described above except that the operation of the timer 20 is started as soon as the circuit breaker 6 opens and closes its auxiliary contacts 38. When the circuit breaker 6 is reclosed in response to the operation of the timer 20 in the manner heretofore described, it is tripped open again if the circuit breaker 5 is closed and the ground is still connected to the load bus end of the broken conductor so that timer continues to effect subsequent reclosing of the circuit breaker. After the timer 20 has been in operation for a predetermined length of time so that it has effected a predetermined number of reclosures of the circuit breaker 6, the projection 33 on the timer 20 enters the notch 34 on the stop 25 and further rotation of the timer 20 by the motor 21 and further automatic reclosures of the circuit breaker 6 are prevented until the stop 25 is reset manually.

It will be observed that by means of my invention I am able to control the operation of the circuit breakers between the feeders and the load bus in the desired manner with a minimum number of potential transformers per feeder as only one single phase potential transformer is required for each feeder in order to effect the reclosing of the associated circuit breaker.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a polyphase source of current, a polyphase load circuit, a polyphase feeder connecting said source and circuit, an overload circuit breaker between said source and feeder, a circuit breaker between said feeder and circuit, fault responsive means for opening said last mentioned circuit breaker, means responsive to a single-phase voltage of said feeder for reclosing said last mentioned circuit breaker, and means for limiting the reclosures of said last mentioned circuit breaker to a predetermined number when a fault occurs which effects the opening of said last mentioned circuit breaker without effecting the opening of said overload circuit breaker and the deenergization of the phase to which said reclosing means responds.

2. In combination, a polyphase source of current, a polyphase load circuit, a polyphase feeder connecting said source and circuit, an overload circuit breaker between said source and feeder, a circuit breaker between said feeder and circuit, means responsive to the direction of power flow through said last mentioned circuit breaker for effecting the opening thereof when power flows from said load circuit to said feeder, means responsive to a single-phase voltage of said feeder for reclosing said last mentioned circuit breaker, and means for limiting the reclosures of said last mentioned circuit breaker to a predetermined number when a fault occurs on said feeder which causes a power reversal through said last mentioned circuit breaker but does not effect the opening of said overload circuit breaker and a failure in the voltage of the phase to which said reclosing means responds.

3. In combination, a polyphase source of current, a polyphase load circuit, a polyphase feeder connecting said source and circuit, an overload circuit breaker between said source and feeder, a circuit breaker between said feeder and circuit, means responsive to a reversal of power through any phase of said feeder for effecting the opening of said last mentioned circuit breaker, means responsive to a predetermined voltage across one of the phases of said feeder when said last mentioned circuit breaker is open for effecting the reclosing thereof, and means for limiting the reclosures of said last mentioned circuit breaker to a predetermined number when a fault occurs on said feeder which causes a power reversal through said last mentioned circuit breaker but does not effect the opening of said overload circuit breaker.

4. In combination, a polyphase supply circuit, a polyphase load circuit, a circuit breaker between said circuits, means responsive to a reversal of power through said circuit breaker for effecting the opening thereof, means responsive to a predetermined single-phase voltage of said supply circuit for effecting the reclosing of said circuit breaker when said circuit breaker is open and said single-phase voltage is above a predetermined value, and means for limiting the number of reclosures of said circuit breaker when a fault occurs on said supply circuit which effects the opening of said circuit breaker but does not effect the deenergization of the phase to which said reclosing means responds.

In witness whereof, I have hereunto set my hand this 7th day of February, 1929.

ARVID E. ANDERSON.